(12) United States Patent　(10) Patent No.: US 9,183,533 B2
Serra et al.　(45) Date of Patent: Nov. 10, 2015

(54) PROVIDING A PATH-BASED IDENTIFIER

(75) Inventors: Bill Serra, Montara, CA (US); Salil Pradhan, San Jose, CA (US); Vinay Deolalikar, Mountain View, CA (US); Geoff Lyon, Menlo Park, CA (US); Jorge Badillo, Rincon, PR (US); Alipio Caban, Arecibo, PR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2364 days.

(21) Appl. No.: 11/264,178

(22) Filed: Nov. 1, 2005

(65) Prior Publication Data

US 2007/0100849 A1　May 3, 2007

(51) Int. Cl.
*G06F 7/00*　(2006.01)
*G06Q 10/10*　(2012.01)
*G06Q 10/08*　(2012.01)
*G06Q 50/30*　(2012.01)

(52) U.S. Cl.
CPC .............. *G06Q 10/10* (2013.01); *G06Q 10/08* (2013.01); *G06Q 50/30* (2013.01)

(58) Field of Classification Search
None
See application file for complete search history.

(56) References Cited

U.S. PATENT DOCUMENTS

| | | | | |
|---|---|---|---|---|
| 2,692,962 | A * | 10/1954 | Thomson | 361/176 |
| 6,405,175 | B1 * | 6/2002 | Ng | 705/14 |
| 2005/0197844 | A1 * | 9/2005 | Ng et al. | 705/1 |
| 2005/0273628 | A1 * | 12/2005 | Onischuk | 713/186 |
| 2006/0247982 | A1 * | 11/2006 | Stolfo et al. | 705/26 |
| 2008/0252459 | A1 * | 10/2008 | Butler et al. | 340/572.1 |
| 2010/0076903 | A1 * | 3/2010 | Klingenberg et al. | 705/333 |

* cited by examiner

*Primary Examiner* — Mussa A Shaawat
(74) *Attorney, Agent, or Firm* — Mannava & Kang, P.C.

(57) ABSTRACT

A path-based identifier is provided. An entity identifier is generated at an entity of a supply chain and the entity identifier is based on a reliability of the entity of the supply chain at which the entity identifier is generated. In addition, an updated path-based identifier is stored based on a predetermined function, where the entity identifier is an input to the predetermined function.

5 Claims, 7 Drawing Sheets

PROVIDING A PATH-BASED IDENTIFIER

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Counterfeit products may enter the supply chain to the customer at any number of different points in the supply chain. For example, a wholesaler may receive counterfeit goods which it passes on to a retailer, or directly to the customer.

Because of the possibility of spoofing, where a counterfeiter copies the packaging of the product, manufacturers often attempt to prevent entry of counterfeit products into the marketplace by protecting the packages. Some approaches that manufacturers have used to make it difficult for counterfeiters include the use of holograms or three dimensional printing on packages. For example, a hologram of a company's logo is placed on a package so a customer buying the product knows that the product is from the company and is not counterfeit. These approaches provide some deterrence; however, counterfeiting has become very sophisticated so that it is has become more difficult for manufacturers to provide product packaging that cannot be replicated by counterfeiters of the product. It is also difficult for receivers of products to know that the supply chain through which the products have traveled is reliable.

SUMMARY

A path-based identifier is provided. An entity identifier is generated at an entity of a supply chain and the entity identifier is based on a reliability of the entity of the supply chain at which the entity identifier is generated. In addition, an updated path-based identifier is stored based on a predetermined function, where the entity identifier is an input to the predetermined function.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A system for providing reliability and authenticity information regarding a package is described herein. The reliability of a path a package takes within a supply chain may be affixed to the package as a path-based identifier. The path-based identifier may include metadata representing the reliability of the path taken by the package. In addition, or alternatively, the path-based identifier may be encoded before being affixed to the package.

In one embodiment, a user may determine how reliable the path taken by the package was based on the value of the path-based identifier. For example, the path-based identifier may include a point value, where the more reliable the path, the lower the point value. Alternatively, the point values may be assigned so that the more reliable the path, the higher the point value. In another example, the path-based identifier may include a series of point values, where each entity through which the package has passed is represented by a point value in the path-based identifier. The user may determine the reliability of the path by summing the point values or by comparing each point value to a desired point value for each entity of the supply chain.

The user may authenticate a package by transmitting the path-based identifier of a package to a server system. The server system may compare the received path-based identifier to a path-based identifier stored in a database in association with a package identifier of the package at the server system or at a database connected to the server system to determine authenticity.

Figure 1:
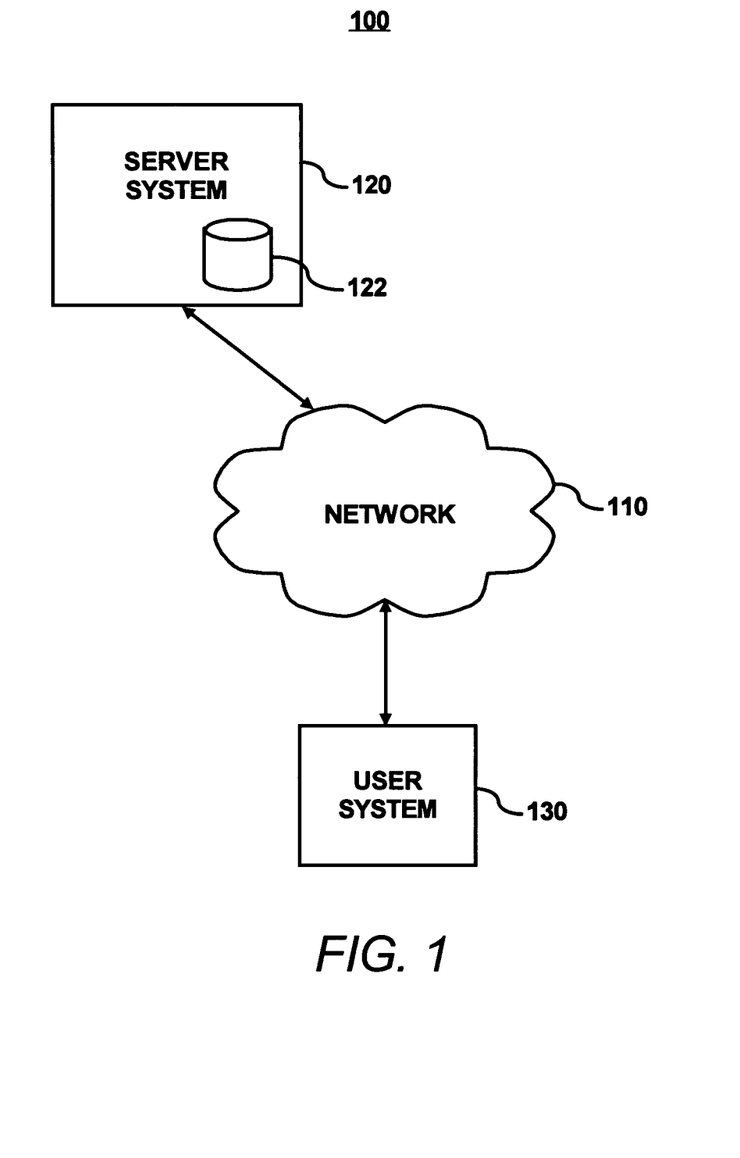
FIG. 1 illustrates an example of a reliability enhancing system, according to an embodiment of the invention.

FIG. 1 illustrates a simplified example of a system 100 through which reliability of a product may be enhanced. The system 100 may include a network 110, a server system 120 and a user system 130. The server system 120 and the user system 130 may include any type of computer system, such as the computer system described with reference to FIG. 7. The server system 120 may include a network interface including software and/or hardware, and serving software (not shown) for communicating with other systems connected to the server system 120 through the network 110. The server system 120 may also include a database 122 storing information with which the server system 120 may authenticate packages. The network 110 may include any type of network, including a LAN, a WAN, the Internet, etc.

In the system 100, a user system 130 may send package information, such as a package identifier and/or a path-based identifier, to be authenticated to a server system 120 via the network 110. For example, the package identifier may include a unique number assigned to each package. The path-based identifier may include information regarding the path taken by the package, such as, information regarding one or more entities of the supply chain through which the package passed, as described in more detail below.

The package information may be input into the user system 120 by using a reader, manually typing information, or any other known procedure for manually or automatically inputting data into a computer system. The reader may include any type of a reader for reading information, including any reasonably suitable type of scanner (such as a bar code scanner), a radio frequency identification ("RFID") tag reader, etc.

The user system 130 may submit the package information to the server system 120 through a website administered by the server system 120. The server system 120 compares the received information to information stored in a database 122. The server system 120 also transmits a message indicating that the package is authentic or informing the user system 130 that the package may not be authentic via the network 110. The message transmitted by the server system 120 may include a message sent to the user's browser or an email or other type of message, including facsimiles. In other embodiments, the user system may submit the package information through a non web based user interface to the server system 120.

Figure 2:
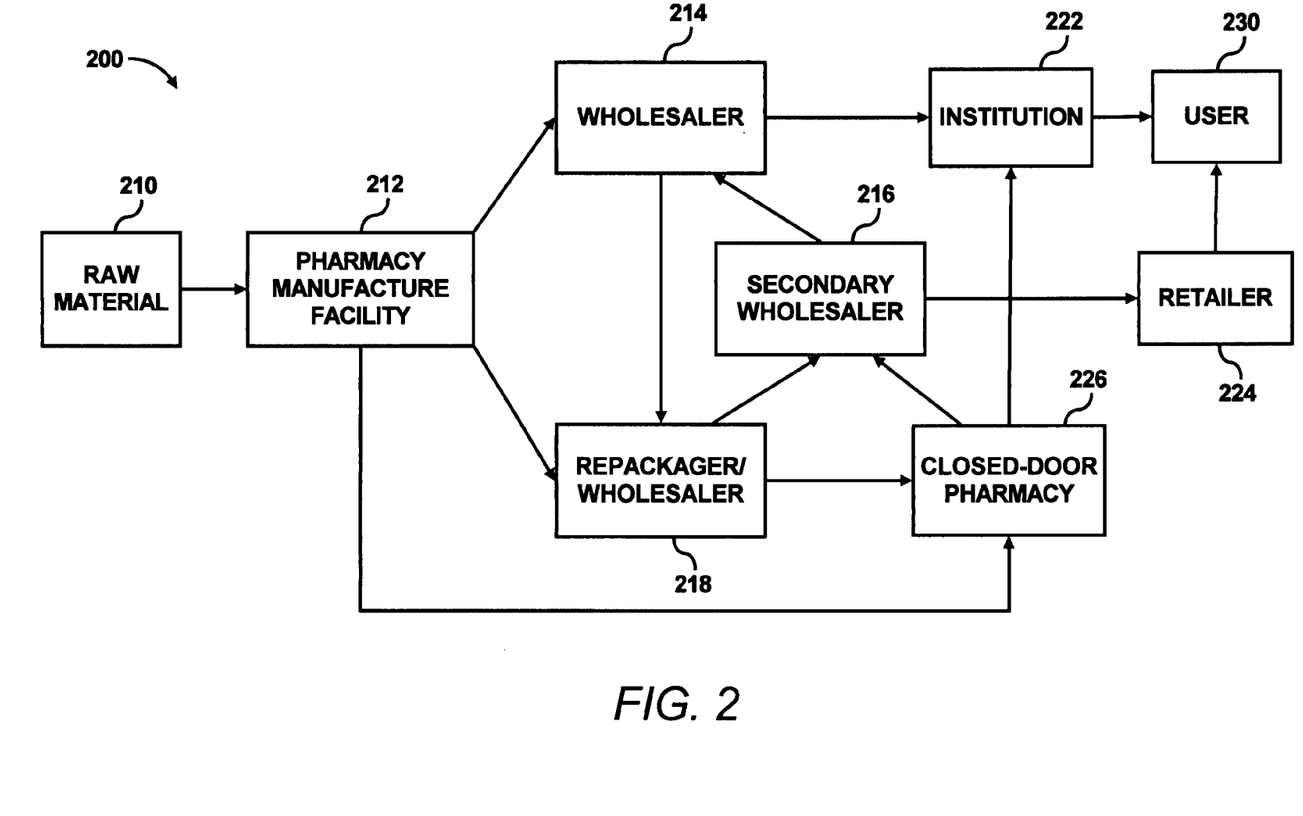
FIG. 2 illustrates an example of a supply chain in which a reliability enhancing system may be used, according to an embodiment of the invention.

The system 100 may be used to authenticate any type of product at any point of a supply chain, from the manufacturer to the customer. As an example, FIG. 2 illustrates a pharmaceutical supply chain 200 and use of the reliability enhancing system in FIG. 1 in the pharmaceutical supply chain 200. It will be apparent that the reliability enhancing system may be used in supply chains for many product types and should thus not be construed as being limited to the pharmaceutical supply chain 200 illustrated in FIG. 2.

FIG. 2 illustrates a simplified example of a supply chain 200 for the sale of pharmaceutical ("pharma") products. As shown in FIG. 2, raw materials 210 are received by a pharma manufacturing facility ("PMF") 212. The PMF 212 sends the manufactured pharma products to a wholesaler 214 or a repackager/wholesaler 218. The wholesaler 214 may sell the pharma products to institutions 222, such as hospitals, nursing homes or hospices, or pharmacies 224, which sell the pharma products to individual users 230. The wholesaler 214 may also send some of its received pharma products to the repackager/wholesaler 218.

The repackager/wholesaler 218 may sell the pharma products to closed-door pharmacies 226. The closed door pharmacies 226 sell the pharma products to institutions 222, such as hospitals, nursing homes or hospices. The PMF 212 may also directly provide pharma products to the closed-door pharmacies 226.

Problems with counterfeit goods may arise with a network of secondary wholesalers 216. Some of the pharma products received by the repackager/wholesalers 218 or closed-door pharmacies 226 may end up at the secondary wholesalers 216, who may sell the pharma products at highly discounted prices to pharmacies 224. The secondary wholesalers 216 may also sell some of the pharma products to the wholesalers 214.

Due to the number of entities handling the pharma products as they progress through the supply chain, pharmacies 224 and institutions 222 may receive counterfeit pharma products. For example, secondary wholesalers 216 may receive counterfeit products, which the secondary wholesalers 216 may sell to pharmacies 224 or wholesalers 214, introducing the counterfeit products into the supply chain. Counterfeit pharma products may include, for instance, pharma products that have been reimported into the country from abroad, pharma products that have expired (but the expiry dates have been changed on the packaging), or pharma products not manufactured by the PMF 212 that are packaged in packaging designed to spoof the packaging of actual pharma products.

The reliability enhancing system 100 in FIG. 1 may be used in the supply chain 200 to authenticate pharma products produced by the PMF 212. The server system 120 used to authenticate the pharma products may be administered by the PMF 212 or administered by an agent of the PMF 212. The user system 130 may be located at any of the other locations in the supply chain 200, including the institution 222, the pharmacies 224, closed-door pharmacies 226, the wholesaler(s) 214, repackager/wholesaler(s) 218, secondary wholesaler(s) 216, or individual user 230. Also, the user system 130 may be located at any point outside of the supply chain where authentication is desired.

The embodiments described herein are not limited for use in a pharmaceutical supply chain, and may be used for authenticating any device or item that may store or otherwise include a package identifier.

Figure 3A:
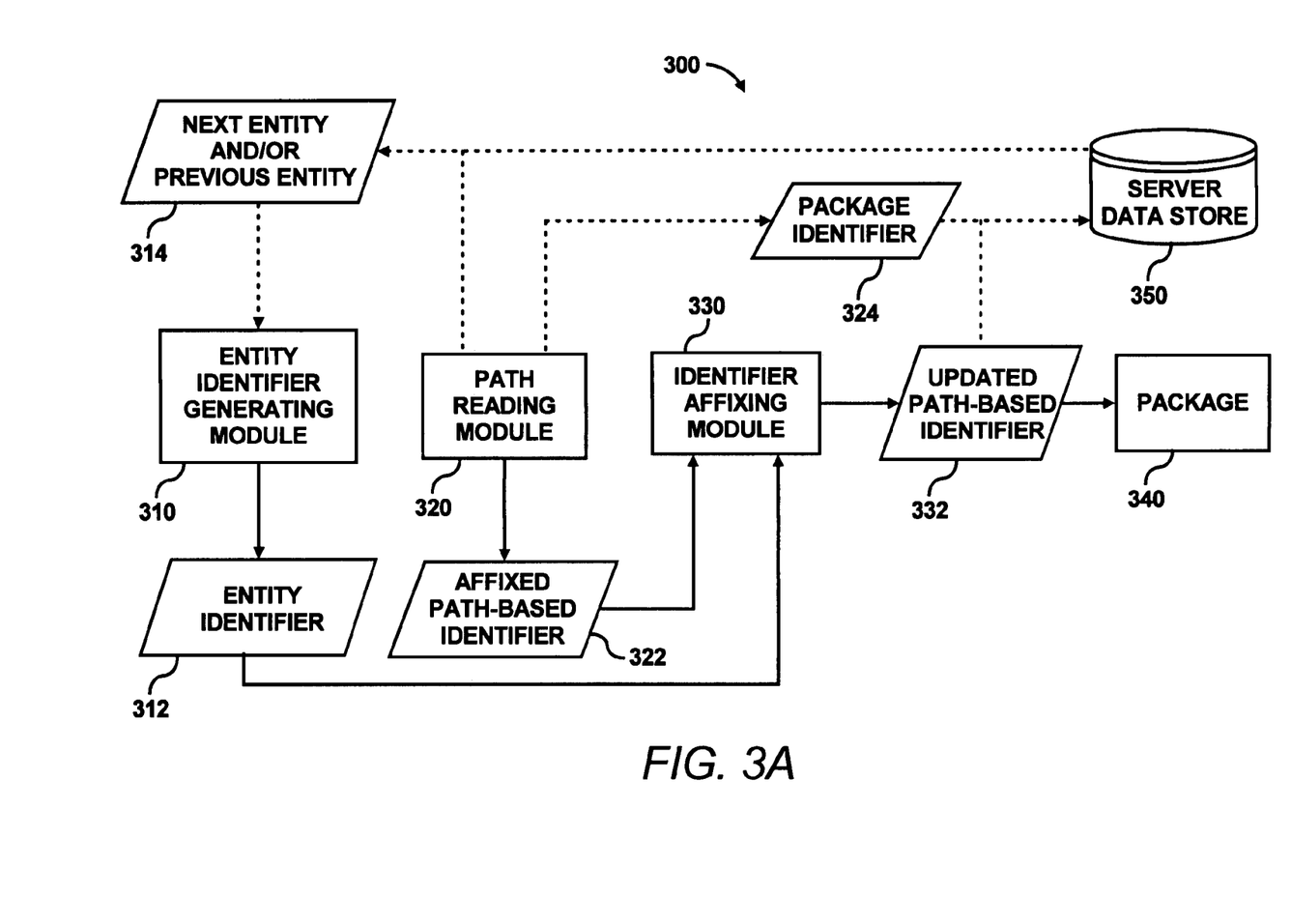
FIG. 3A illustrates data flow within an embodiment of a system for providing a path-based identifier, according to an embodiment of the invention.

FIG. 3A illustrates data flow within an embodiment of a path-based identifier providing system 300. The path-based identifier may include path information regarding entities in the supply chain path through which a package has passed. The path information may include metadata regarding reliability of each entity or of the totality of entities of the supply chain path. For example, the metadata may include a point value representing the reliability of an entity of the supply chain path taken by the package, a point value representing the reliability of all of the entities of the supply chain path, or a point value representing the least reliable entity of the supply chain path.

The path-based identifier providing system 300 may be used to provide a path-based identifier at any entity of the supply chain. As shown in FIG. 3A, the path-based identifier providing system 300 may include a path-based identifier generating module 310, a path reading module 320, and an identifier affixing module 330.

The path-based identifier generating module 310 may generate at least part of a path-based identifier, such as an entity identifier 312. The entity identifier 312 may be generated based at least in part on a next entity and/or a previous entity 314 in the path taken by the package 340 through the supply chain.

In one embodiment, the path reading module 320 may read the next and/or previous entity of the path from the package 340. In another embodiment, the path reading module 320 may read a package identifier 324 from the package 340 and submit the package identifier 324 to a server data store 350. The server data store 350 may provide the next and/or previous entity 314 to the path-based identifier generating module 310 for use in generating the entity identifier 312. The path reading module 320 may also read an affixed path-based identifier 322, if a path-based identifier has previously been affixed to the package 340.

At the path reading module 320, a reading device reads the package 340. The package 340 may be read using a scanner or other reading device to obtain the package identifier 324. The path reading module 320 also reads the affixed path-based identifier 322 and the next entity and/or previous entity 314 (if this information is affixed to the package 340) from the package 340 using either the same reading device or other reading devices, depending, for example, on how the affixed path-based identifier 322 and the next entity and/or previous entity 314 is affixed to the package 340. In one example, if the affixed path-based identifier 322 is stored in an RFID tag, the affixed path-based identifier 322 may be read using an RFID tag reader. In some embodiments, the path reading module 360 may also decode the affixed path-based identifier 322 to recover the path-based identifier metadata, if the affixed path-based identifier 322 is in encoded form.

The entity identifier 312 may also be submitted to the identifier affixing module 330. If the package includes a previously affixed path-based identifier 322, the affixed path-based identifier 322 may also be submitted to the identifier affixing module 330. In addition, the identifier affixing module 330 may affix an updated path-based identifier 332 to the package 340. The updated path-based identifier 332 may include the entity identifier 312, the affixed path-based identifier 322 augmented with the entity identifier 312, the affixed path-based identifier 322 or a sum of the affixed path-based identifier 322 and the entity identifier 312, depending on a predetermined function of the identifier affixing module 330. For example, if the path-based identifier is to include a single numerical value, the updated path-based identifier 332 may be selected to be the greater of the entity identifier 312, the affixed path-based identifier 322, or a sum of the entity identifier 312 and the affixed path-based identifier 322.

If the path-based identifier 322 is to include a value for each entity of the path or a predetermined number of entities of the path, the updated path-based identifier 332 may include the affixed path-based identifier 322 augmented with the entity identifier 312. In another example, a portion of the affixed path-based identifier 322 may be replaced with the entity identifier 312 to reflect, for example, that the entity identifier 312 is greater in value than the replaced portion of the affixed path-based identifier 322.

The identifier affixing module 330 may also cause the updated path-based identifier 332 to be stored in the server data store 350 for use in authentication. For example, the updated path-based identifier 332 may be stored in the server data store 350 in association with the package identifier 324 for the package 340.

The updated path-based identifier 332 may be affixed to the package using any reasonably suitable affixing method. For example, the updated path-based identifier 332 may be affixed using a printing process, a label, a RFID tag or an embedded microprocessor, an electronic substrate or some other type of electronic active device with memory capabilities and internal power is used to store the encrypted information until it is further accessed for authentication at some other point of the supply chain.

For example, the package 340 may include an RFID tag. The RFID tag may include one or more types of information for the package 340, such as the package identifier 324, which may include a serial number. In some embodiments, the RFID tag may store the updated path-based identifier 332. A predetermined number of bits of available storage in the RFID tag may be allocated for the path-based identifier. For example, at least 5 bits of the available storage of the RFID tag may be allocated for the path-based identifier. In other embodiments, a greater or lesser number of bits of the available storage of the RFID tag may be allocated for the path-based identifier.

The RFID tag may use radio frequency technology to transmit information stored in the RFID tag. For example, the RFID tag may include an integrated circuit and an antenna. The RFID tag preferably includes a passive RFID tag (not using an internal power source such as a battery). However, an active RFID tag (using an internal power source, such as a battery) may be used. The RFID tag may be read by a RFID reader (not shown). The RFID reader may generate a magnetic field for interrogating the tag using an antenna, which may include an inductive element. The magnetic field induces an energizing signal for powering the RFID tag via the antenna. When powered the RFID tag generates a signal which may include information associated with the package 340. The signal may be modulated using a known modulation scheme and transmitted to the RFID reader.

The RFID tag may be read or written to from distances of up to 20 feet, and is not required to be in the line of sight of the RFID reader to be read. For example, the object causing the loss of the line of sight may allow radio waves to pass through the object, such as plastic or paper objects. The RFID tag may be affixed onto the package 340 prior to, during, or after a process of printing information on the material used to form the package 340 or on material affixed to the package 340, such as a label. It will be apparent to one of ordinary skill in the art that instead of a RFID tag, other known techniques may be used for storing the updated path-based identifier 332 on the package 340, such as bar code, variable color text, color lines, fingerprint patterns, color tiles, microtext, and other printed patterns with encoded information and other types of printed mediums. Also, tags other than radio frequency, and other storage mediums that may be affixed to or may be included in the inner package 304-307 may be used.

Figure 3B:
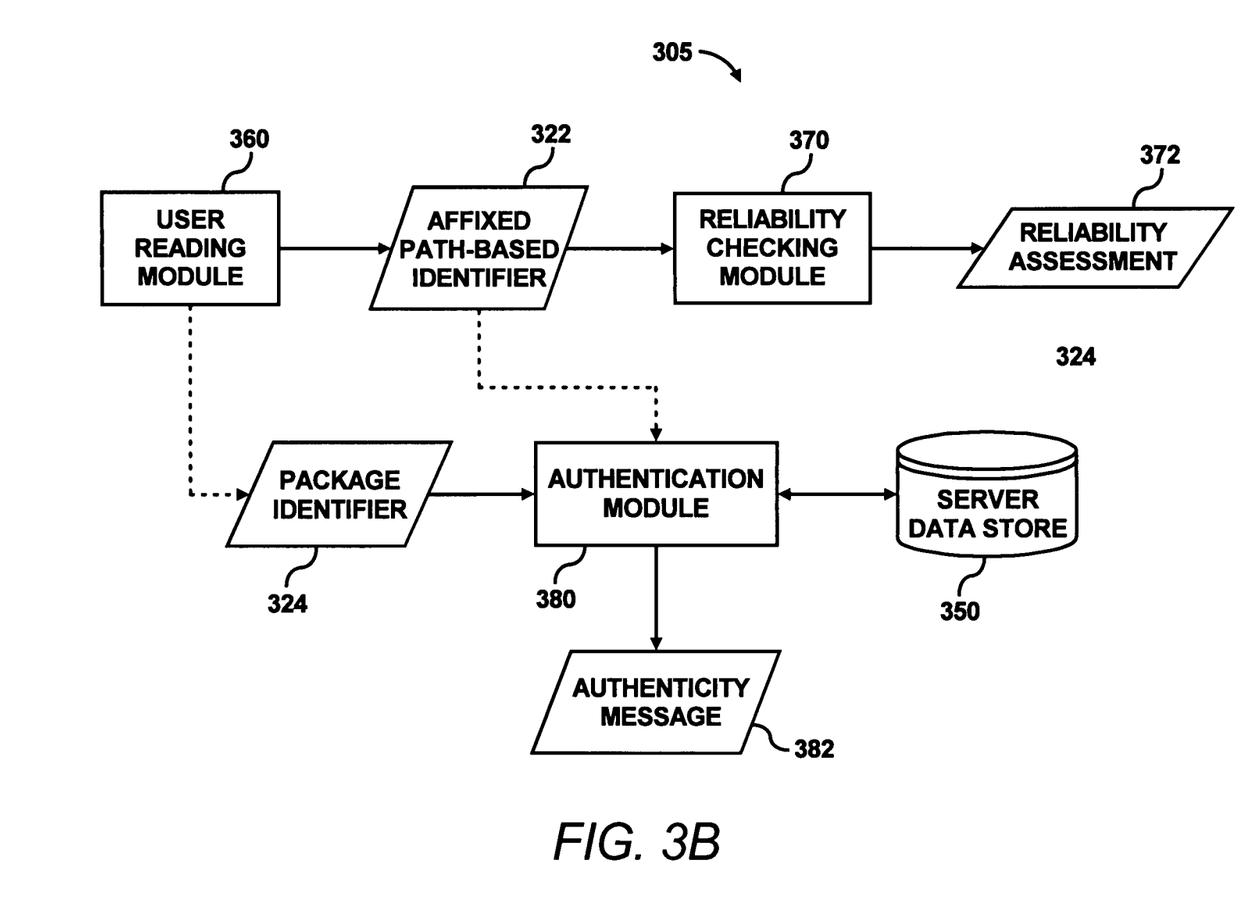
FIG. 3B illustrates data flow within an embodiment of a system for determining reliability and authenticity of packages, according to an embodiment of the invention.

FIG. 3B illustrates data flow within an embodiment of a reliability/authenticity determining system 305 for packages. The reliability/authenticity determining system 305 may include a user reading module 360, a reliability checking module 370, and an authentication module 380. The user reading module 360, the reliability checking module 370 and the authentication module 380 may be part of the user system 130 shown in FIG. 1. In some embodiments, however, the authentication module 380 may be part of the server system 120.

The user reading module 360 generally operates in a manner similar to the path reading module 320. At the user reading module 360, a reading device reads each package 340. The package 340 may be read using a scanner or other reading device. The user reading module 340 also reads the affixed path-based identifier 322 from the package 340 using either the same reading device or another reading device, depending, for example, on how the affixed path-based identifier 322 is affixed to the package 340. In one example, if the affixed path-based identifier 322 is stored in an RFID tag, the affixed path-based identifier 322 may be read using an RFID tag reader. In some embodiments, the user reading module 360 may also decode the affixed path-based identifier 322 to recover the path-based identifier metadata if the affixed path-based identifier 322 is affixed to the package 340 in an encoded form.

The reliability checking module 370 receives the affixed path-based identifier 322 from the user reading module 360 and generates a reliability assessment 372 for the package 340 based on the affixed path-based identifier 322. The reliability assessment 372 may be based on a predetermined function executed by the reliability checking module 370. For example, the predetermined function may be configured to compare the affixed path-based identifier 322 to one or more predetermined values representing one or more levels or reliability. More particularly, for instance, the one or more predetermined values may include a minimum reliability value, such as 3, where any value above 3 would indicate that the path taken by the package did not meet the minimum reliability required by the user.

In another example, the one or more predetermined values may include a desirable reliability, such as 2, and a passable reliability, such as 4, where a value for the affixed path-based identifier 322 of 3 would indicate that some extra checking of the package 340 may be needed while a value of 2 would indicate that the path of the package 340 does not require extra checking of the package. The reliability assessment 372 may be in any desired format, such as a message indicating the reliability of the package path or a detailed comparison of the predetermined values and the actual value(s) of the affixed path-based identifier 322.

The authentication module 380 receives the affixed path-based identifier 322 and the package identifier 324 from the user reading module 360. In some embodiments, the user system 130 may submit the affixed path-based identifier 322 and the package identifier 324 to the authentication module 380 through a website if the authentication module is part of the server system 120. The website may be administered by the server system 120. In other embodiments, the user system 130 may submit the affixed path-based identifier 322 through a non-web based user interface accessing the authentication module 380.

The authentication module 380 compares the affixed path-based identifier 322 to a stored path-based identifier to determine whether the package 340 is authentic. The authentication module 380 provides an authenticity message 382 to the user system 130 indicating whether the package is authentic or not authentic. The authenticity message 382 may include a facsimile, an email or a message displayed on a web page viewable in a web browser of the user system 130, where the web page is part of a website administered by the server system 120. In other embodiments, the message may be displayed on a non-web based user interface.

Figure 4:
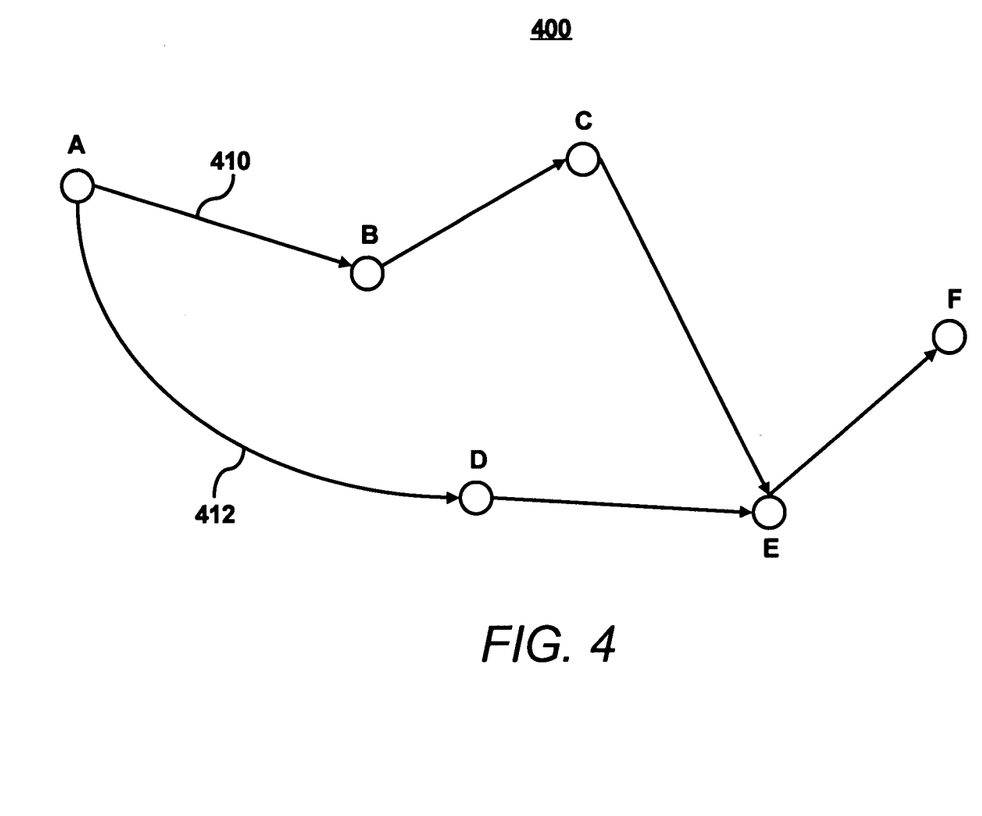
FIG. 4 illustrates possible movements of a package in a supply chain, according to an embodiment of the invention.

FIG. 4 illustrates possible paths taken by a package through a supply chain. As shown in FIG. 4, a package may follow a first path 410 from entity A to entity F or a second path 412 from entity A to entity F. If a package follows the first path 410, the package passes through entities B, C and E en route to entity F from entity A. If a package follows the second path 412, the package passes through entities D and E en route to entity F from entity A. The path-based identifier affixed to the package at entity F, such as the affixed path-based identifier 322 shown in FIG. 3B, will depend on whether the package followed the first path 410 or the second path 412.

In some embodiments, each of the entities A-E may be assigned a point value. For example, the point value of each of the entities may be represented as the generated entity identifier 312 shown in FIG. 3A. The point values assigned to the entities A-E may, for instance, be based upon historical data pertaining to the entities A-E. By way of example, it may be determined that counterfeit or contaminated products have been found among products having traveled along routes in which one or more of the entities A-E were visited in the past month. In this example, the historical data may be implemented to assign relatively negative point values to those one or more entities A-E located in the particular route. In addition, various routes may be analyzed to determine at which of the entities A-E the counterfeit products were most likely introduced. The entities A-E may be further analyzed to determine additional details in determining those responsible for introducing the counterfeit or contaminated products.

In addition, or alternatively, the point values may be assigned to the entities A-E based upon current shipment information. By way of example, if a particular shipment is found to be corrupted or counterfeit, that shipment may be given a relatively lower reliability number. For instance, the packages contained in that shipment may be given a sufficiently low reliability number to cause the packages to be removed from commerce and returned, for instance, to the manufacturer, such as may occur when products are recalled.

In some embodiments, the assigned point value may include a weighted reliability score. The weighted reliability score of a particular entity may be dependent upon a next entity or a previous entity of the path 410, 412. The next entity may include the entity directly following the particular entity on the path 410, 412 being followed, the destination entity, such as entity F, or another entity within or outside of the supply chain, depending on design or preference. The previous entity may include the entity directly before the particular entity on the path 410, 412 being followed, the origination entity, such as entity A, or another entity within or outside of the supply chain, depending on design or preference.

The weighted reliability score may vary with the path. For example, if the weighted reliability score of a particular entity depends on the entity directly following the particular entity, the weighted reliability score of the particular entity will depend on the entity to which the package is to be transmitted next. For example, if entity A generated an entity identifier 312, the value of the entity identifier 312 would depend on whether the package to receive the entity identifier 312 were following the first path 410, and going to entity B next, or the second path 412, and going to entity D next.

The weighted reliability score may depend on trust between the entities A-F of the supply chain. For example, if the weighted reliability score included a number between 1 and 5, a particular entity that was highly trusted by the entity assigning the weighted reliability score may give the particular entity a score of 1. In some embodiments, the more highly trusted an entity is by another entity, the lower the score. In other embodiments, the more highly trusted an entity is by another entity, the higher the score assigned to the entity.

Where a prior relationship does not exist between an entity assigning a score and the entity to which the score is to be assigned, a relationship between an intermediate entity may be used to assign the score. For example, if no prior relationship exists between entity D and entity E, but relationships exist between entity C and entity D and entity C and entity E, entity E may assign a score to entity D based on the score assigned entity D by entity C. However, entity E may add a predetermined value to the score assigned to entity D by entity C to represent that the score is based on an indirect relationship as opposed to a direct relationship.

In some embodiments, the path-based identifier may depend on a predetermined function applied to the entity identifiers generated at each of the entities of the path 410, 412 followed by the package. For example, referring to FIG. 3A, the predetermined function may comprise using the higher of the affixed path identifier 322 and the entity identifier 312 at each entity, so that the updated path identifier 332 reflects the value of the entity having the highest weighted reliability score. Alternatively, the predetermined function may comprise using the lower of the affixed path identifier 322 and the entity identifier 312 at each entity, so that the updated path identifier 332 reflects the value of the entity having the lowest weighted reliability score.

In another example, the predetermined function may comprise performing a sum of the affixed path-based identifier 322 and the entity identifier 312 so that the updated path-based identifier reflects the value of the sum of the weighted reliability scores of all of the entities of the path 410, 412 divided by the number of entities in the path 410, 412 followed by the package 340.

In another example, the predetermined function may comprise inserting the entity identifier 312, of the entity at which the path-based identifier generating step is being performed, at a predetermined location in the path-based identifier. For example, the predetermined function may indicate that the entity identifier 312 be inserted at the third and fourth bits of the path-based identifier. Thus, the updated path-based identifier 332 would include the entity identifier 312 at the third and fourth bits.

In another example, the predetermined function may include inserting the entity identifier 312 into the updated path-based identifier 332 along with a unique entity designation (not shown) identifying to which entity the entity identifier 312 belongs. The unique entity designation may include a serial number or name or other identification information for the entity. Thus, the updated path-based identifier 332 may include a series of entity identifiers 322, each entity identifier 322 associated with a unique entity designation to identify to which entity each entity identifier 322 belongs.

In another example, the predetermined function may include selecting a predetermined number of the highest weighted reliability scores (or alternatively lowest reliability scores) as the updated path-based identifier 332. For example, the predetermined function may be to include the two highest weighted reliability scores. Thus, the function may include comparing the entity identifier 312 to each of the two portions of the affixed path-based identifier 322 reserved for the two highest weighted reliability scores. If the entity identifier 312 is higher than either of the values in the two portions of the affixed path-based identifier 322, the function includes replacing the lower of the values in the two portions of the affixed path-based identifier 322 with the entity identifier 312.

Figure 5:
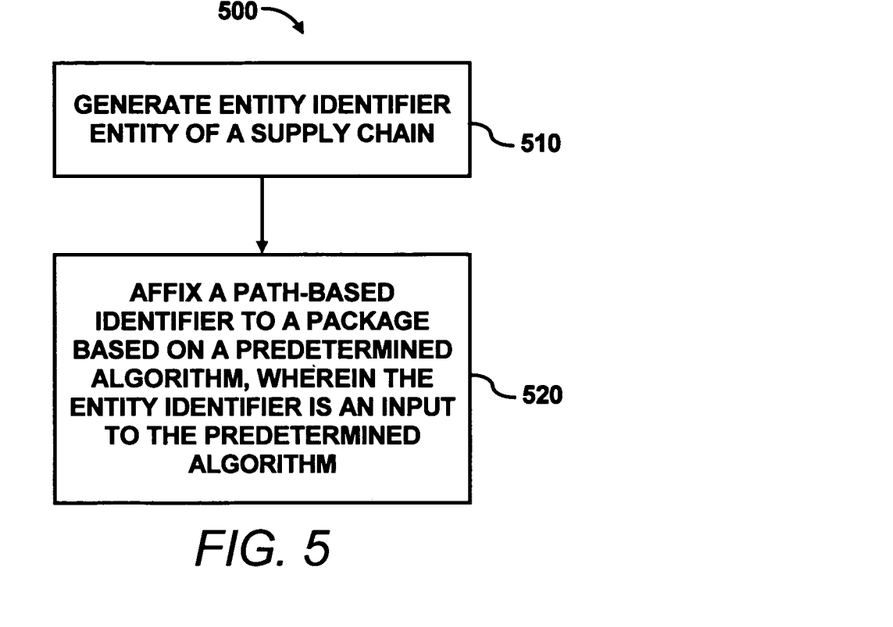
FIG. 5 illustrates a flow diagram of a method of providing a path-based identifier, according to an embodiment of the invention.

FIG. 5 illustrates a flow diagram illustrating an embodiment of a method 500 of providing a path-based identifier to a package, as shown in FIGS. 3A and 3B, which may be used for determining reliability of a path taken by the package through a supply chain and authenticity of the package. At step 510, an entity identifier may be generated at an entity of a supply chain. The entity identifier may be based on reliability of the entity of the supply chain at which the entity identifier is generated.

In some embodiments, the entity identifier may include metadata. In addition, or alternatively, the entity identifier may include points allocated to the entity at which the entity identifier is assigned. The points may be based on reliability of the entity at which the entity identifier is generated. The reliability of the entity at which the entity identifier is assigned may be based on the relationship of the entity at which the entity identifier is assigned to at least one of a next or a previous entity of a package path of the supply chain as described above with respect to FIG. 4.

At step 520, an updated path-based identifier may be affixed to a package based on a predetermined function, wherein the entity identifier is an input to the predetermined function. Affixing the updated path-based identifier to the package may include affixing the updated path-based identifier in at least one of a printed material, a label, an RFID tag, an embedded microprocessor, an electronic substrate or a type of electronic active device with memory capabilities and internal power. In some embodiments, affixing the updated path-based identifier may include encoding of the updated path-based identifier.

In some embodiments, the predetermined function may include the selection of a predetermined number of at least one of the highest weighted reliability scores and the lowest weighted reliability scores from a previously affixed path-based identifier and the entity identifier, as described above with respect to FIG. 4. In addition or alternatively, the predetermined function may include the selection of a higher one of the entity identifier and a previously affixed path-based identifier. In addition or alternatively, the predetermined function may include the performance of a sum of a previously affixed path-based identifier and the entity identifier. As another example, the predetermined function may include the insertion of the entity identifier at a predetermined location of the updated path-based identifier. As a further example, the predetermined function may include the insertion of the entity identifier into the updated path-based identifier along with a unique entity designation identifying the entity. As a yet further example, the predetermined function may include the augmentation of a previously affixed path-based identifier with the entity identifier.

The method 500 of providing the path-based identifier may further include the storage of the updated path-based identifier in a server so that the updated path-based identifier may be used to authenticate the package. The method 500 may additionally include determination of the reliability of the package 340 as illustrated in FIG. 6 and described below.

Figure 6:
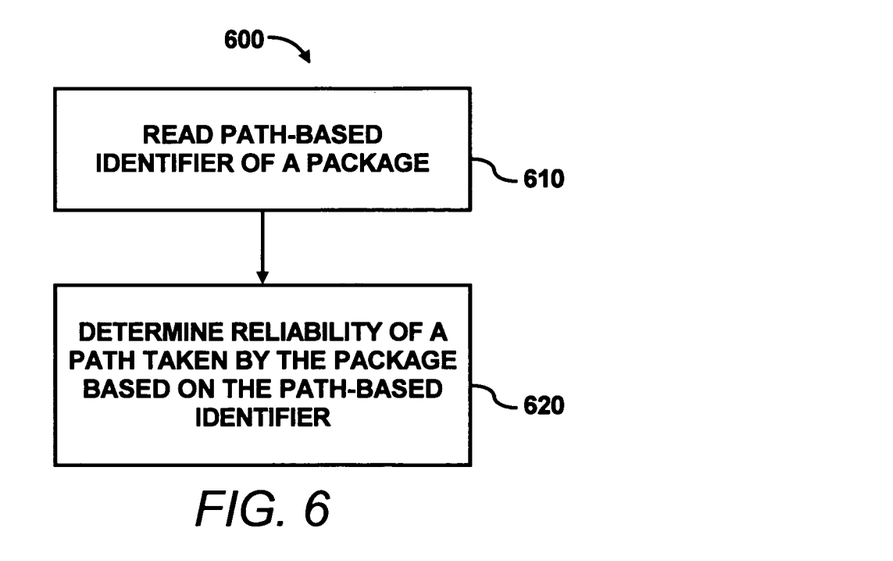
FIG. 6 illustrates a flow diagram of a method of determining reliability of a package, according to an embodiment of the invention.

FIG. 6 is a flow diagram illustrating a method 600 of determining reliability of the package 340, as shown in FIGS. 3A and 3B. At step 610, a path-based identifier may be read from a package. The path-based identifier may be read from the package through reading of the path-based identifier from at least one of a printed material, a label, an RFID tag, an embedded microprocessor, an electronic substrate or a type of electronic active device with memory capabilities and internal power.

At step 620, the reliability of a path taken by the package through a supply chain may be determined based on the path-based identifier. In some embodiments, the path-based identifier may include points, and determining reliability of the package may include determining reliability of the package based on the number value of the points. The number value of the points may be based on the reliability of the entities of the supply chain through which the package traveled.

The method 600 may also include authenticating the package based on the path-based identifier. The package 340 may be authenticated through a comparison of the path-based identifier with a stored path-based identifier. The authentication may be performed in the user system 130, shown in FIG. 1, or the server system 120. For example, the user system 130 may receive a copy of the path-based identifier from the server system 120 to compare to the path-based identifier affixed to the package 340. In this example, the authentication module may form part of the server system 120.

In another example, the server system 120, as shown in FIG. 1, may receive the affixed path-based identifier from a user system 130. The user may transmit the path-based identifier from the user system 130 to the authentication module 380. In this example, the authentication module 380 may form part of the server system 120. The server system 120 may administer an authentication website through which the user may submit the affixed path-based identifier to the server system 120. In other embodiments, the user system 130 may submit the affixed path-based identifier through a non-web based user interface accessing the authentication module 380.

Figure 7:
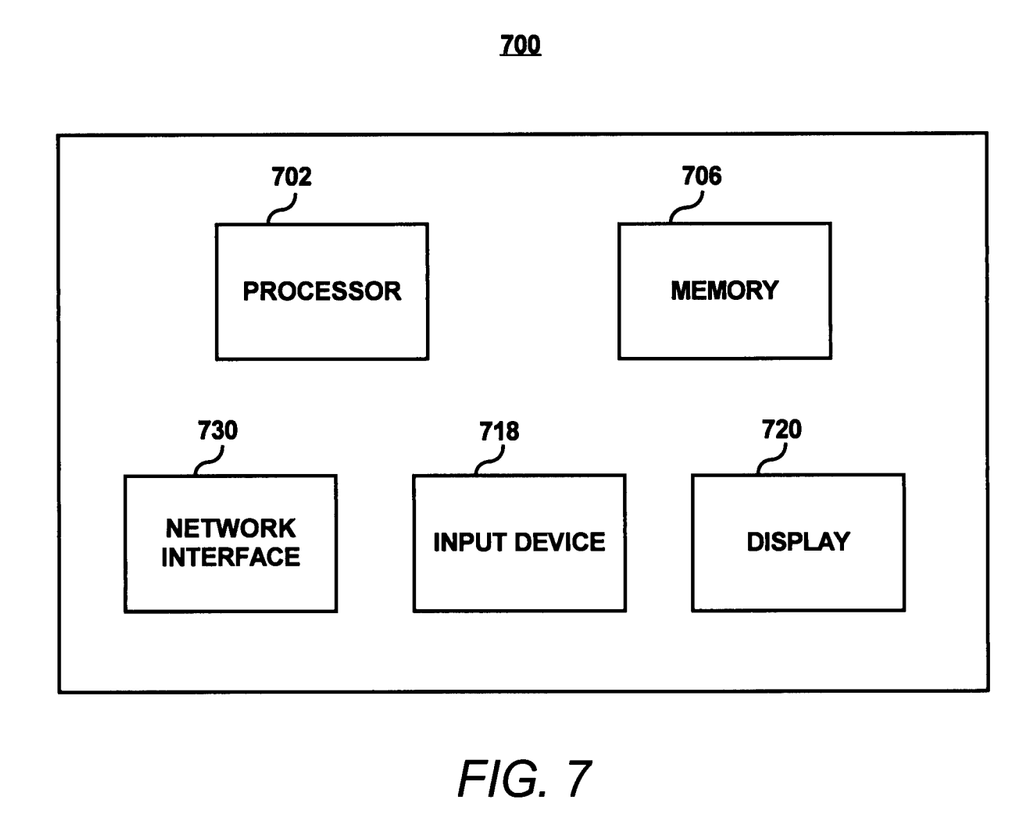
FIG. 7 is a block diagram illustrating a computer system operable to perform the method depicted in FIGS. 5 and 6, according to an embodiment of the invention.

Referring to FIG. 7, and also with reference to FIG. 1, a schematic diagram of a computer system 700 is shown in accordance with an embodiment. The computer system 700 shown may be used as a server in the system shown in FIG. 1. The computer system 700 may include one or more processors, such as processor 702, providing an execution platform for executing software. The computer system 700 also includes a memory 706, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 700 with one or more input devices 718, such as a keyboard, a mouse, a stylus, and the like and a display 720. A network interface 730 is provided for communicating with other computer systems. It will be apparent to one of ordinary skill in the art that FIG. 7 is meant to illustrate a generic computer system. Any type of computer system may be used. Furthermore, one or more components of the components of the computer system 700 are optional, such as the display and input devices, and other types of components may be used or substituted as is known in the art.

One or more of the steps of the operations shown in FIGS. 5 and 6 may be implemented as software embedded on a computer readable medium, such as the memory 706, and executed by the processor 702. The steps may be embodied by a computer program, which may exist in a variety of forms both active and inactive. For example, there may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of determining reliability and providing authentication of a package against counterfeit or contaminated products based upon a path-based identifier of the package, said method comprising steps performed by a processor of:

in the processor, reading the path-based identifier of the package to identify a path taken by the package, wherein the path-based identifier includes a reliability value;

determining a reliability of the path taken by the package through a supply chain based upon the path-based identifier by comparing the reliability value of the path-based identifier of the package to a predetermined minimum reliability value;

authenticating the package by comparing the path-based identifier of the package to a path-based identifier stored in a server in association with a package identifier of the package, wherein the path taken by the package includes at least one entity and a next entity directly following the at least one entity on the path, wherein the at least one entity is assigned a point value representing a reliability of the at least one entity and the next entity and is based on whether counterfeit or contaminated products have been found among products having traveled through the at least one entity, and wherein the reliability value of the path-based identifier of the package is based on the point value of the at least one entity;

reading the package identifier from the package and submitting the package identifier to the server, wherein the server provides a next or previous entity based on the submitted package identifier; and generating a new path-based identifier for the package based on the next or previous entity received from the server.

2. The method of claim 1, wherein the step of reading the path-based identifier further comprises reading the path-based identifier from at least one of a printed material, a label, an RFID tag, an embedded microprocessor, an electronic substrate or a type of electronic active device with memory capabilities and internal power.

3. A system for providing a path-based identifier, the system comprising:

a memory storing, an entity identifier generating module to generate an entity identifier at an entity of a supply chain, the entity identifier being based on the entity of the supply chain at which the entity identifier is generated; and an identifier affixing module configured to affix a path-based identifier to a package based on a predetermined function, wherein the entity identifier is an input to the predetermined function;

a reliability checking module configured to make a reliability assessment for the package against counterfeit or contaminated products, wherein the reliability checking module is configured to determine a reliability value of a path taken by the package through a supply chain based upon the path-based identifier of the package, wherein the reliability value of the path is based on a point value assigned to at least one entity on the path taken by the package, wherein the path taken by the package further includes a next entity directly following the at least entity in the path, and wherein the point value assigned to the at least one entity is based on whether counterfeit or contaminated products have been found among products having traveled through the at least one entity and a reliability of the next entity; and compare the determined reliability value of the path to at least one predetermined reliability value; and an authentication module configured to determine authenticity of the package by comparing the path-based identifier of the package to a path-based identifier stored in a server in association with a package identifier of the package; and a reading module configured to read the package identifier of the package and submit the package identifier to the server, wherein the server generates a next or previous entity based on the submitted package identifier, and wherein the path-based identifier to be affixed to the package is generated by a path-based identifier generating module based on the next or previous entity received from the server.

4. The system of claim 3, wherein the path-based identifier of the package comprises metadata representing the reliability of the path taken by the package along the supply chain.

5. A computer readable storage device storing a computer program for determining reliability and providing authentication of a package against counterfeit or contaminated products based on a path-based identifier, said computer program comprising a set of instructions to be executed by a processor to:

read the path-based identifier of the package to identify a path taken by the package, wherein the path-based identifier includes a reliability value;

determine a reliability of the path taken by the package through a supply chain based upon the path-based identifier by comparing the reliability value of the path-based identifier of the package to a predetermined minimum reliability value;

authenticate the package by comparing the path-based identifier of the package to a path-based identifier stored in a server in association with a package identifier of the package, wherein the path taken by the package includes at least one entity and a next entity directly following the at least one entity on the path, wherein the at least one entity is assigned a point value representing a reliability of the at least one entity, and wherein the reliability value of the path-based identifier of the package is based on the point value of the at least one entity and the next entity and is based on whether counterfeit or contaminated products have been found among products having traveled through the at least one entity;

read the package identifier from the package and submit the package identifier to the server, wherein the server provides a next or previous entity based on the submitted package identifier; and     generate a new path-based identifier for the package based on the next or previous entity from received the server.

* * * * *